Patented July 28, 1931

1,816,564

UNITED STATES PATENT OFFICE

LLOYD M. BURGHART, OF BALTIMORE, MARYLAND, ASSIGNOR TO U. S. INDUSTRIAL ALCOHOL CO., OF NEW YORK, N. Y., A CORPORATION OF WEST VIRGINIA

MANUFACTURE OF CELLULOSE ACETATE

No Drawing.    Application filed February 24, 1928. Serial No. 256,817.

The invention relates to the art of making cellulose esters of organic acids by treating cellulose or cellulose derivatives with active acylating agents such as the anhydrids or halids of the organic acids.

In the usual processes of making cellulose acetate cellulose is digested with at least two and a half times its weight of acetic anhydride, in the presence of four to five times its weight of glacial acetic acid, and a small amount of sulfuric acid, which last is usually referred to as a catalyst or condensing agent. The result of this operation is usually cellulose acetate which is soluble in chloroform and insoluble, or little soluble, in acetone; or, depending upon the manner in which acetylation is performed, the cellulose acetate obtained may be soluble in a mixture of alcohol and chloroform. Such cellulose acetate may then be converted by a further treatment to the more valuable acetone soluble form. This step usually involves the introduction of water into the reaction mass to break down the excess acetic anhydride to acetic acid, and the digestion of the resulting mixture until the cellulose acetate is hydrated to the desired degree as indicated by the solubility behavior in acetone, the supposition being that the cellulose acetate is partially hydrated or hydrolyzed.

In such processes both the glacial acetic acid and the excess acetic anhydride are degraded to dilute acetic acid, which must be worked back to glacial acetic acid for re-use in the manufacturing operation, or disposed of otherwise. The cost of recovering the acetic acid values is high, and constitutes a reason for the high cost of cellulose acetate.

In these processes the reaction mass constituting the intermediate product, either at the end of the acetylating step or at the end of the hydrating step, is a fairly thick magma of sluggish flow containing cellulose acetate colloidally dispersed or dissolved in acetic acid and the small quantity of sulfuric acid. When this mass is precipitated in water in the usual manner to separate the cellulose acetate from the bulk of the acid, the former sets, but does not disintegrate. Even when the set acetate gel is mechanically comminuted,—by no means an easy task on a large scale,—the removal of the acid therefrom is a tedious proceeding, because it depends on diffusion and replacement, rather than on washing of the small integral particles. The usually unavoidable result is a washing liquid averaging anywhere from two to four per cent., or even less, of acetate acid, the economic concentration of which is the severest handicap in the acetyl cellulose industry today, since it means the evaporation of some twenty-five to fifty pounds of water per pound of acetic acid recovered, and roughly, the handling of ten times this amount of liquid per pound of cellulose acetate.

It is not only economically necessary to recover the expensive acetic acid values, but it is also essential from the standpoint of the final product that it be substantially free from acid, and particularly that it be freed as far as possible from all traces of the sulfuric acid used as a catalyst or promoter. Hence there are two very important reasons for thorough washing. Thorough washing may also remove color and corrosion products, and increase the stability of the cellulose acetate.

An important object of my invention is to reduce the cost of manufacturing cellulose acetate. The object, also, is to provide a process in which the acylation is accomplished within a moderate space of time, and results in a uniform excellent product.

A specific object, in the reduction of the manufacturing cost of cellulose acetate, is to avoid the large amounts of dilute acetic acid values resulting in the usual processes. The simplest form of my process does not require the use of acetic acid as such for accomplishing acylation. Consequently, though the acetylating agent employed may be and preferably is acetic anhydride, the dilute acetic acid at the end of the operation need be only that resulting from the breaking down of the anhydride, which agent can be employed in moderate amount.

I have ascertained that cellulose can be successfully and economically acetylated with an acetylating agent such as acetic anhydride, when in the presence of liquid sulfur dioxid as a reaction medium or menstruum, and a suitable catalyst or condensing agent such as, for example, sulfuric acid. The liquid sulfur dioxid dissolves or holds in colloidal dispersion the cellulose ester as it is formed but does not appear to enter into the reaction, and it seems likely that its function partakes of a catalytic nature.

However, I do not undertake to say just how the sulfur dioxid acts in acetylation accomplished by this process. It is remarkable that, whereas acetic acid and acetic anhydride are closely related chemically, sulfur dioxid bears no such relationship to any of the acetylating agents which are employed.

While it is a distinct advantage to be able to avoid the use of acetic acid as such in the acetylating bath, since the expense of regenerating dilute acetic acid is thereby greatly cut down, it will be evident that acetic acid can be used with the sulfur dioxid, if for any reason it should be desired to do so. If this constituent of the acetylating bath should be composed in part of liquid sulfur dioxid and in part of glacial acetic acid, it would follow that the amount of degraded acetic acid eventually to be restored to glacial would be reduced in proportion to the quantity of liquid sulfur dioxid employed, the advantage of the invention in cheapening the manufacture of cellulose acetate being realized to a corresponding extent.

Furthermore, as hereinafter explained, the acetic anhydride for the acetylation can be obtained either in the presence or in the absence of the cellulose and/or a suitable catalyst, by the reaction between ketene and glacial acetic acid in liquid sulfur dioxide. This is not inconsistent with the object of avoiding large amounts of dilute acetic acid values to be recovered, since the acetic acid used as such need be only in such amount as is required to produce the desired amount of anhydride.

At the conclusion of the acetylation process, the contents of the reaction vessel may be discharged into a body of water, or other suitable liquid, to arrest the reaction and to precipitate the cellulose acetate, which is then thoroughly washed. By an after-treatment with a hydrolizing agent, the cellulose acetate may be rendered soluble in acetone.

It is not essential that the cellulose acetate be precipitated in a liquid medium, as it can be spray or splatter dried in the air or in an atmosphere of the sulfur dioxid gas, or it can be discharged in the air or in the $SO_2$ atmosphere upon a foraminous collecting belt.

In any case, the sulfur dioxid escapes freely from the mixture, and it is easily regenerated for reuse. This is in marked contract to the difficulty and expense of removing and regenerating the large excess of acetic acid usually employed for acetylation.

In carrying out the invention I employ a closed reaction vessel capable of holding pressure, and in this vessel I place finely divided cellulose, cellulosic material or a cellulose derivative, and introduce the other ingredients. I have found it satisfactory to mix the acetic anhydride and sulfuric acid in the proper quantities, add the liquid sulfur dioxid, and then introduce the mixture into the vessel containing the cellulose. However, the order of introducing or mixing the materials may be varied, though I have found it advisable that neither the sulfuric acid nor the anhydride, nor the mixture of the two, come in contact with the cellulose before diluting with the sulfur dioxid. All openings are tightly closed, and the mixture is digested until the desired degree of acetylation is obtained, which is accomplished in about 18 hours, more or less.

The temperature and pressure at which acetylation is conducted may be varied. It is advisable not to carry out the acetylation at temperatures above 30° C., and it is advantageous to keep the temperature as much lower than that as general conditions will allow. Other things being equal, lower temperatures are conducive to higher viscosity, greater strength and better color in the product. I have conducted the acetylation satisfactorily at a temperature of 17–18° C. and a pressure of 25–26 lbs. The temperature might be kept low enough so that the pressure would be little above atmospheric. The pressure in the vessel will naturally depend upon the temperature and also upon the amount of $SO_2$ in the vessel.

Proportions which I have found suitable, but which are susceptible of variation, stated in terms of grams and cubic centimeters, are 200 grams of cellulose (pulp, or linters, or other forms, usually oven dried at about 60° C.), 720 cc. of 95% acetic anhydride, 3400 cc. of liquid sulfur doixid, and 5 grams of ordinary concentrated sulfuric acid, these being given by way of concrete example. For further illustration, it may be stated that the amount of sulfuric acid may be increased, and the amounts of sulfur dioxide and acetic anhydride may be decreased, this, however, not being in limitation of the direction of permissible variation, but indicating a direction in which proportions may be varied in the interest of economy.

If the original material was cellulose, there is produced chloroform soluble cellulose acetate in the mass in the reaction chamber, or the acetylation may be so conducted as to obtain chloroform-alcohol soluble cellulose acetate.

I do not exclude acetylating cellulose or a cellulose derivative which has received one of the preliminary treatments which are known to hydrate it prior to acetylation.

The cellulose or cellulose derivative having been sufficiently acetylated, I may now open an outlet from the reaction vessel and discharge the contents.

The space where the charge is blown out of the reaction vessel is enclosed and provided with a suitable offtake in order that the sulfur dioxid gas which escapes from the discharged mass may be recovered for re-use.

I do not necessarily limit myself to the use of acetic anhydride, as other acetylating agents are known, for example, acetyl chlorid.

Furthermore, acetic anhydride can be obtained by the interaction of glacial acetic acid and ketene. Indeed, given a cheap supply of ketene, it is a quick and easy way of producing acetic anhyride. I have ascertained that the result can be advantageously secured by passing ketene into glacial acetic acid dissolved in liquid sulfur dioxid, and further that a satisfactory acetylating bath can be obtained in this way, with the addition of the requisite amount of sulfuric acid or other catalyst or condensing agent. The ketene and the glacial acetic acid may be caused to react with each other before being added to the cellulose, or they may be permitted to react in the presence of the cellulose to form the anhydride in the acetylating vessel, the sulfuric acid being added to the acetic acid or at any other convenient stage. The amounts of acetic acid and ketene used in such an acetylating bath are preferably such as to obtain the requisite amount of acetic anhydride without an excess, or at least without a large excess, of acetic acid left in the bath. However, while it is an advantage of my general invention that an excess of acetic acid is avoided, it will be evident that such an excess can be used if desired. Likewise I do not necessarily limit myself to sulfuric acid as catalyst, promoter or condensing agent. Various others of these agents are known, for example, zinc chlorid, phosphoric acid, and dimethyl sulfate, and can be used, as I have ascertained, with liquid sulfur dioxid, for acetylation within the general scope of my invention, and there are doubtless others. Consequently when sulfuric acid is referred to, it is to be understood as representing any suitable catalyst that may be employed.

I claim:

1. The process of making cellulose acetate which comprises treating the material to be acetylated with an acetylating bath containing liquid sulfur dioxid.

2. The process of acetylating cellulose which comprises subjecting the material to be acetylated in a closed reaction chamber to the action of an acetylating agent, in the presence of a catalyst and liquid sulfur dioxid.

3. The process of acetylating cellulose which comprises subjecting the material to be acetylated in a closed reaction chamber to the action of acetic anhydride, in the presence of a catalyst and liquid sulfur dioxid.

4. The process of acetylating cellulose or a cellulose derivative which comprises subjecting the same to the action of a mixture of acetic anhydride, sulfuric acid and liquid sulfur dioxid.

5. The process of making a cellulose ester of an organic acid, which comprises treating the material to be acylated with an acetylating agent in the presence of a menstruum comprising liquid sulfur dioxid.

6. The process of making a cellulose ester of an organic acid, which comprises treating the material to be acylated with an acetylating agent in the presence of a catalyst and of liquid sulfur dioxid as a menstruum.

7. The process of making a cellulose ester of an organic acid, which comprises treating the material to be acylated with the anhydrid of the acid in the presence of a menstruum comprising liquid sulfur dioxid.

8. The process of making a cellulose ester of an organic acid, which comprises treating the material to be acylated with the anhydrid of the acid in the presence of a catalyst and of liquid sulfur dioxid as a menstruum.

LLOYD M. BURGHART.

CERTIFICATE OF CORRECTION.

Patent No. 1,816,564.  Granted July 28, 1931, to

LLOYD M. BURGHART.

It is hereby certified that error appears in the printed specification of the above numbered patent requiring correction as follows: Page 3, lines 85 and 86, claim 5, and lines 90 and 91, claim 6, for "acetylating" read acylating; and that the said Letters Patent should be read with these corrections therein that the same may conform to the record of the case in the Patent Office.

Signed and sealed this 29th day of September, A. D. 1931.

M. J. Moore,
Acting Commissioner of Patents.

(Seal)